US011943340B2

United States Patent
Cui et al.

(10) Patent No.: US 11,943,340 B2
(45) Date of Patent: Mar. 26, 2024

(54) PROCESS-TO-PROCESS SECURE DATA MOVEMENT IN NETWORK FUNCTIONS VIRTUALIZATION INFRASTRUCTURES

(71) Applicant: Intel Corporation, Santa Clara, CA (US)

(72) Inventors: Bo Cui, Shanghai (CN); Cunming Liang, Shanghai (CN); Jr-Shian Tsai, Portland, OR (US); Ping Yu, Shanghai (CN); Xiaobing Qian, Changning (CN); Xuekun Hu, Shanghai (CN); Lin Luo, Shanghai (CN); Shravan Nagraj, Bengaluru (IN); Xiaowen Zhang, Shanghai (CN); Mesut A. Ergin, Portland, OR (US); Tsung-Yuan C. Tai, Portland, OR (US); Andrew J. Herdrich, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 268 days.

(21) Appl. No.: 17/437,342

(22) PCT Filed: Apr. 19, 2019

(86) PCT No.: PCT/CN2019/083396
§ 371 (c)(1),
(2) Date: Sep. 8, 2021

(87) PCT Pub. No.: WO2020/211071
PCT Pub. Date: Oct. 22, 2020

(65) Prior Publication Data
US 2022/0150055 A1  May 12, 2022

(51) Int. Cl.
*H04L 9/06* (2006.01)
*G06F 21/33* (2013.01)
(Continued)

(52) U.S. Cl.
CPC .......... *H04L 9/0825* (2013.01); *H04L 9/0631* (2013.01); *H04L 9/085* (2013.01); *H04L 63/0236* (2013.01)

(58) Field of Classification Search
CPC ..... H04L 9/0825; H04L 9/0631; H04L 9/085; H04L 63/0236
(Continued)

(56) References Cited

U.S. PATENT DOCUMENTS

| 7,512,815 B1 * | 3/2009 | Munetoh ............... H04L 9/0844 713/193 |
| 2005/0080982 A1 * | 4/2005 | Vasilevsky ............ G06F 3/0607 711/1 |

(Continued)

FOREIGN PATENT DOCUMENTS

| CN | 103069428 A | 4/2013 |
| CN | 109558740 A | 4/2019 |

OTHER PUBLICATIONS

Sowmya Nagasimha Swamy; Security Threats in the Application layer in IOT Applications; IEEE:2017; pp. 477-480.*

(Continued)

*Primary Examiner* — Monjur Rahim
(74) *Attorney, Agent, or Firm* — Compass IP Law PC

(57) ABSTRACT

In some examples, for process-to-process communication, such as in function linking, a virtual channel can be provisioned to provide virtual machine to virtual machine communications. In response to a transmit request from a source virtual machine, the virtual channel can cause a data copy from a source buffer associated with the source virtual (Continued)

machine without decryption or encryption. The virtual channel provisions a key identifier for the copied data. The destination virtual machine can receive an indication data is available and can cause the data to be decrypted using a key accessed using the key identifier and source address of the copied data. In addition, the data can be encrypted using a second, different key for storage in a destination buffer associated with the destination virtual machine. In some examples, the key identifier and source address is managed by the virtual channel and is not visible to virtual machine or hypervisor.

21 Claims, 10 Drawing Sheets

(51) Int. Cl.
  *G06F 21/72* (2013.01)
  *G06F 21/78* (2013.01)
  *H04L 9/08* (2006.01)
  *H04L 9/40* (2022.01)
(58) Field of Classification Search
  USPC .......................................................... 713/171
  See application file for complete search history.

(56) References Cited

U.S. PATENT DOCUMENTS

| | | | |
|---|---|---|---|
| 2007/0245409 A1* | 10/2007 | Harris | H04L 67/06 726/5 |
| 2011/0302400 A1* | 12/2011 | Maino | H04L 9/0825 713/189 |
| 2015/0381589 A1* | 12/2015 | Tarasuk-Levin | G06F 9/45558 713/193 |
| 2017/0187694 A1* | 6/2017 | Friedman | G06F 21/53 |
| 2018/0191607 A1* | 7/2018 | Kanakarajan | G06F 21/552 |
| 2018/0329975 A1* | 11/2018 | Brown | G06F 16/221 |
| 2019/0058709 A1* | 2/2019 | Kempf | G06F 21/64 |
| 2020/0226074 A1* | 7/2020 | Durham | G06F 21/78 |
| 2021/0117249 A1* | 4/2021 | Doshi | H04L 67/1001 |
| 2021/0152643 A1* | 5/2021 | Mathur | G06F 9/54 |
| 2022/0400123 A1* | 12/2022 | Ayoub | G06F 3/067 |

OTHER PUBLICATIONS

International Search Report and Written Opinion for PCT Patent Application No. PCT/CN2019/083396, dated Jan. 21, 2020, 9 pages.

* cited by examiner

US 11,943,340 B2

PROCESS-TO-PROCESS SECURE DATA MOVEMENT IN NETWORK FUNCTIONS VIRTUALIZATION INFRASTRUCTURES

CLAIM OF PRIORITY

This application is a U.S. National Phase application under 35 U.S.C. § 371 of International Application No. PCT/CN19/83396 filed Apr. 19, 2019, entitled "PROCESS-TO-PROCESS SECURE DATA MOVEMENT IN NETWORK FUNCTIONS VIRTUALIZATION INFRASTRUCTURES the entire contents of which are incorporated herein by reference.

TECHNICAL FIELD

Various examples described herein relate to techniques for secure data movement between processes in a network function virtualization environment.

BACKGROUND

In Network Functions Virtualization (NFV), virtualized network functions handle specific network functions that run in one or more virtual machines in a hardware infrastructure such as switches, routers, or servers. For example, European Telecommunication Standards Institute (ETSI) Industry Specification Group for Network Functions Virtualization is defining standards for NFV. NFV can provide networking functions such as security, firewalls, domain name services (DNS), network address translation (NAT), caching, and so forth.

In NFV, service function linking is common usage to process a payload using a set of independent function services. Virtual network functions (VNF) can be an implementation of a network function run in virtual machines (VMs). VNFs can be combined or linked together to perform networking services. Multiple VNFs can be added to one or more servers and can be monitored and controlled by a hypervisor. Instead of sharing memory across multiple VMs or among service instances, when data security is a concern, data can be moved copied between isolated domains (e.g., VMs or containers).

DETAILED DESCRIPTION

Figure 1:
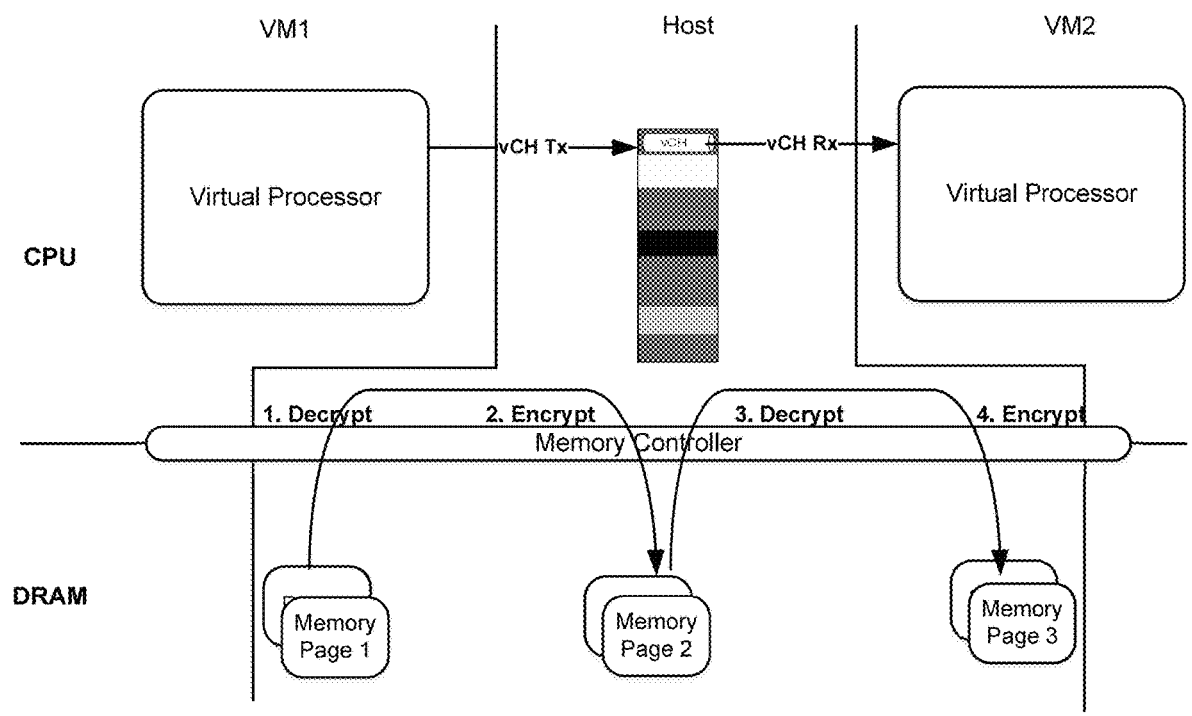
FIG. 1 shows an example of data transfer between linked virtual machines.

FIG. 1 shows an example of data transfer between linked virtual machines. In this example, a first VM (e.g., VM1) transfers data to a second VM (e.g., VM2) using two memory movements and associated total memory encryption (TME) operations. VM1 and VM2 do not share the same memory space or share memory addresses. To copy data from VM1 to VM2, the data payload is encrypted and protected using various page keys to ensure no plain text is exposed inside a dynamic random access memory (DRAM). The data is copied from memory page 1 (source) to memory page 2 (intermediate buffer). A second copy is made from memory page 2 to memory page 3 (destination). There are four cryptography operations involved during the two copy operations (e.g., a decryption, an encryption, another decryption, and another encryption). More specifically, for a data copy from memory page 1 to memory page 2, data is decrypted after being read from memory page 1 and encrypted before being written to memory page 2. For a data copy from memory page 2 to memory page 3, the data is decrypted after being read from memory page 2 and encrypted before being written to memory page 3. Encryption and decryption operations use processor resources and consume power and introduce latency before data is available at a destination (memory page 3). Encryption for a write to an intermediate buffer and decryption for buffer read from the intermediate buffer are a pair of crypto-operations on the same content and use the same key but the payload is not modified. Duplicated crypto operations involving copies to and from the intermediate buffer introduce copy latency and power cost.

Various embodiments provide for copying an encrypted memory page or a portion of a source memory page in volatile or non-volatile memory to a destination memory page in volatile or non-volatile memory using a single decryption and a single encryption operation. Fewer decryption and encryption operations can reduce CPU use, save power, and reduce latency for data copy availability at the destination. A virtual channel can copy the data from a source memory page to an intermediate page without decryption and encryption of the data. In connection with a copy of data to the intermediate page, the virtual channel can store metadata concerning the copied data into a metadata table or the intermediate page. The metadata can include an encryption key identifier and a source memory address. The virtual channel can be used to invoke a decryption operation and encryption operation for the data to the destination memory page. The key associated with the encryption key identifier can be used to decrypt data stored in the intermediate page. Before the data is written to the destination, the data can be encrypted using a different key.

Some embodiments can invoke use of a memory controller with a cryptography capability to decrypt stored data (e.g., bits, bytes, plain text, encrypted content) read from an intermediate buffer, encrypt the decrypted data, and cause the encrypted data to be written to a destination volatile memory region. To decrypt the data, the memory controller can use a key associated with the data and the key is identified in a metadata table provisioned by a trusted hypervisor or a virtual channel. To encrypt the data that is to be written to the destination memory region, the memory controller can use a different page key that is provisioned by a hypervisor or VM2.

In some embodiments, to secure data stored in memory, memory pages or buffers of various domains are protected by Intel TME, Intel MK-TME, Intel SGX, AMD's Secure Memory Encryption (SME), AMD's Secure Encrypted Virtualization (SEV), ARM TrustZone, and so forth. The use of virtual channel with crypto engine provides an integrated solution at least for secure VM-to-VM communications, intra-VM communications, or container-to-container communications, but also adds cost of data translation (e.g., decryption or encryption) while moving data between various memory pages.

A virtual machine running a VNF can request processing to be performed by a second virtual machine running another VNF thereby linking VNF operations. Data copied from the source memory page to the destination memory page can be used by the second virtual machine's VNF to perform processing. Processed data from the second virtual machine can be encrypted and transferred back to the first virtual machine using similar techniques as used to transfer data from the first virtual machine to the second virtual machine.

Total memory encryption (TME) and multi-key total memory encryption (MKTME) are available from Intel Corporation and are described in the Intel Architecture Memory Encryption Technologies Specification version 1.1 dated Dec. 17, 2017 and later revisions, available at https://software.intel.com/en-us/blogs/2017/12/22/intel-relea es-new-technology-specification-for-memory-encryption. Embodiments are not limited to employing only TME or MKTME. TME provides a mechanism to encrypt data on the memory interfaces. The memory controller uses a cryptography engine to encrypt the data flowing out on the memory interfaces to the memory or decrypt data flowing in from memory and provides plain text for internal consumption by the processor.

TME is a technology that encrypts a device's entire memory or portion of a memory with a single key. When enabled via basic I/O system (BIOS) configuration, TME can help ensure that all memory accessed by a processor on an external memory bus is encrypted, including customer credentials, encryption keys, and other data. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption can be generated using a hardened random number generator in the processor and is never exposed to software. Data in memory and on the external memory buses is encrypted and is only in plain text while inside the processor circuitry. This allows existing software to run unmodified while protecting memory using TME. There may be scenarios where it would be advantageous to not encrypt a portion of memory, so TME allows the BIOS to specify a physical address range of memory to remain unencrypted. The software running on a TME-capable system has full visibility into all portions of memory that are configured to not be encrypted by TME. This is accomplished by reading a configuration register in the processor.

In an embodiment, TME supports multiple encryption keys (Multi-Key TME (MKTME)) and provides the ability to specify the use of a specific key for encrypting or decrypting a page of memory (e.g., an addressable region of memory). This architecture allows either processor-generated keys or tenant-provided keys, giving full flexibility to customers. VMs and containers can be cryptographically isolated from each other in memory with separate encryption keys, an advantage in multi-tenant cloud environments. VMs and containers can also be pooled to share an individual key, further extending scale and flexibility. This includes support for both standard dynamic random-access memory (DRAM) and non-volatile random-access memory (NVRAM).

A virtual machine (VM) can be software that runs an operating system and one or more applications. The virtual machine is defined by specification, configuration files, virtual disk file, NVRAM setting file, and the log file and is backed by the physical resources of a host computing platform.

A container can a software package of applications, configurations and dependencies so the applications run reliably on one computing environment to another. Containers can share an operating system installed on the server platform and run as isolated processes.

A process can be any software that is executed by a computer (including executables, binaries, libraries, or any code). An example process is a VNF. Multiple processes can be executed within a VM or container.

A core can be an execution core or computational engine that is capable of executing instructions. A core can have access to its own cache and read only memory (ROM), or multiple cores can share a cache or ROM. Cores can be homogeneous and/or heterogeneous devices. Frequency or power use of a core can be adjustable. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Cores can also include a system agent. System agent can include or more of: a memory controller, a shared cache, a cache coherency manager, arithmetic logic units, floating point units, core or processor interconnects, or bus or link controllers. System agent can provide one or more of: direct memory access (DMA) engine connection, non-cached coherent master connection, data cache coherency between cores and arbitrates cache requests, or Advanced Microcontroller Bus Architecture (AMBA) capabilities.

Figure 2A:
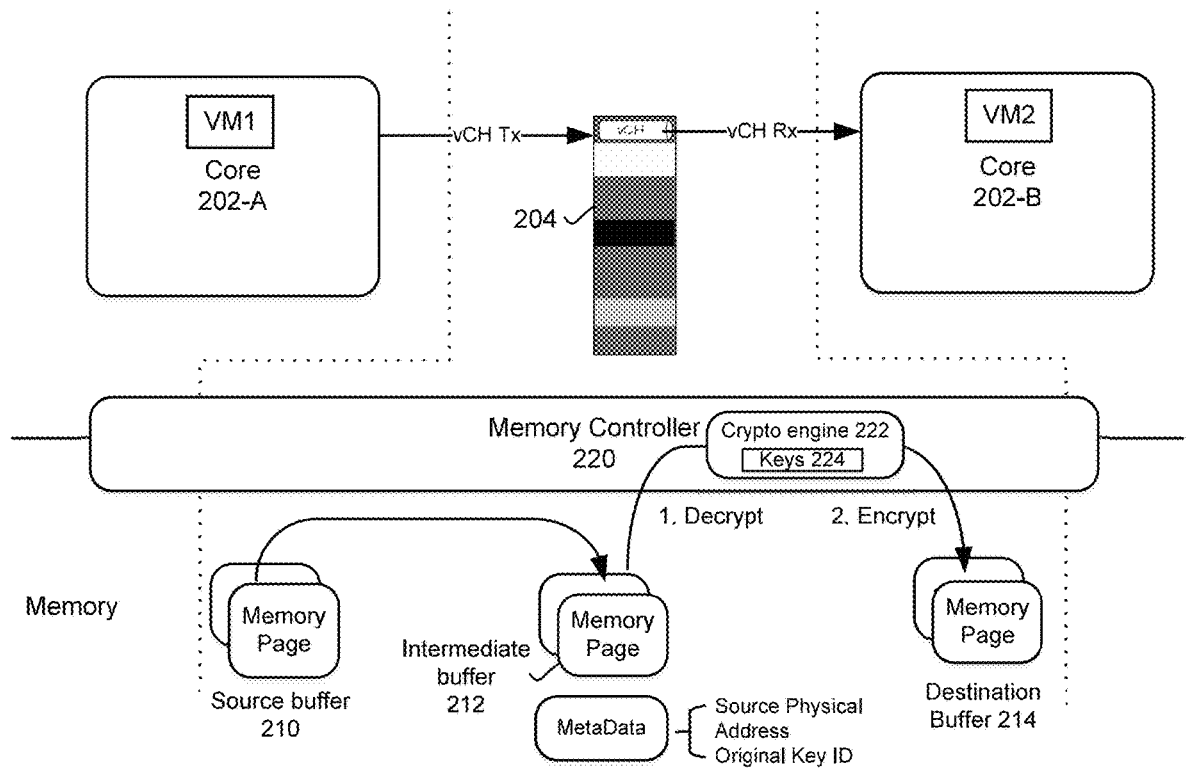
FIG. 2A depicts a system in accordance with some embodiments.

FIG. 2A depicts a system in accordance with some embodiments. In connection with VM-to-VM communications such as VNF-to-VNF communications or intra-process communications within a VM, the system can copy data from a source memory page associated with a first VM (or process) to a destination memory page associated with a second VM (or process) via an intermediate buffer using a single decrypt operation and a single encrypt operation. Example operations that VNFs can perform include next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC). The source memory page can be an origin of data and accessible by VM1. VM1 can be executed by core 202-A, for example. The source memory page can be encrypted with a key identified using a Key ID. Key ID can be provided with a physical address and provisioned into a page table during a memory page allocation phase. For example, a crypto engine can be used to encrypt data using the key. The key can be stored in a memory location accessible to the crypto engine. The key can be accessed by using the Key ID and a source address of the data. The data can be copied without decryption or translation from a source memory page to an intermediate memory buffer. The VM1 can initiate a data transfer by instructing virtual channel 204 to cause a copy operation. Virtual channel 204 can be assigned to provide VM1-to-VM2 communication by the hypervisor of VM1 and VM2. VM2 can be executed by core 202-B, for example. In some examples, VM1 and VM2 are separate virtual machines. In some examples, VM1 and VM2 represent different processes that are performed within a single virtual machine.

For example, virtual channel (vCH) 204 provides single-producer single-consumer channel between VMs. Virtual channel 204 can include a ring that stores messages provided between virtual machines. In this example, a hypervisor has provisioned virtual channel 204 as solely between VM1 and VM2. Virtual channel 204 can provide a message ring for message sending between VMs. Virtual channel 204 can manage an intermediate buffer page or pages 212 without use of crypto engine 222 available for use to memory controller 220 (e.g., without total memory encryption engine (TME) protection). In this example, VM1 places a message on a ring of virtual channel 204 and VM2 obtains the message from the ring. The message ring can be stored in volatile memory.

In response to a message from VM1 to transmit data, virtual channel 204 can cause memory controller 220 to copy the data from source buffer 210 to intermediate memory buffer 212 but without decryption or encryption. Virtual channel 204 can also store metadata in a volatile memory. The metadata can include a key Id and starting physical address of the source data. Accordingly, the data stored in intermediate buffer 212 can be associated with metadata including key Id and a starting physical address (at the source memory page). For example, data can include one or more of: packet data, packet context, packet header, packet payload, and so forth. The data can be provided for processing by a VNF of VM2 for example. The metadata can be used to decrypt the page or data read from the intermediate buffer before writing the data into destination buffer 214 in one or more memory pages accessible to VM2. In some examples, the metadata is opaque data managed by the virtual channel and is not visible to any virtual machine or hypervisor. In some examples, the metadata can be stored in a memory region that is visible to either or both of VM1 and VM2 and encrypted. Before decrypting the data from intermediate buffer 212, crypto engine receives the key ID and source address from virtual channel 204. For example, the write command from VM1 can include a combination of the keyID with the source address, both of which are embodied inside the physical address.

Virtual channel 204 can post an interrupt to VM2 or otherwise indicate that data is available for copy. VM2 can issue a receive command to the virtual channel by placing the receive command on the message ring. In response to a receive command, the virtual channel can invoke use of memory controller 220 and crypto engine 22 to copy data from intermediate buffer 212 to destination buffer 214. Virtual channel 204 can cause crypto engine 222 to use a key accessible from key table 224 associated with the key ID and source address in order to decrypt the source data stored in the intermediate buffer.

Virtual channel 204 can provide a key ID and source address for a memory access to memory controller 220 so that crypto engine 222 can retrieve a key to use to decrypt the source data from the intermediate buffer. In some examples, crypto engine 222 maintains an internal key table 224 not accessible by software to store key associated with each KeyID. The physical address (source address) can be used to configure the data encryption or decryption. For example, crypto engine 222 can access a key from a secure table (e.g., key table 224) accessible to crypto engine 222. In addition, virtual channel 204 causes crypto engine 222 to encrypt the data using a default memory page key for VM2 and memory controller 220 causes the encrypted data (based on the default memory page key for VM2) to be stored into VM2's destination buffer 214.

Figure 4:
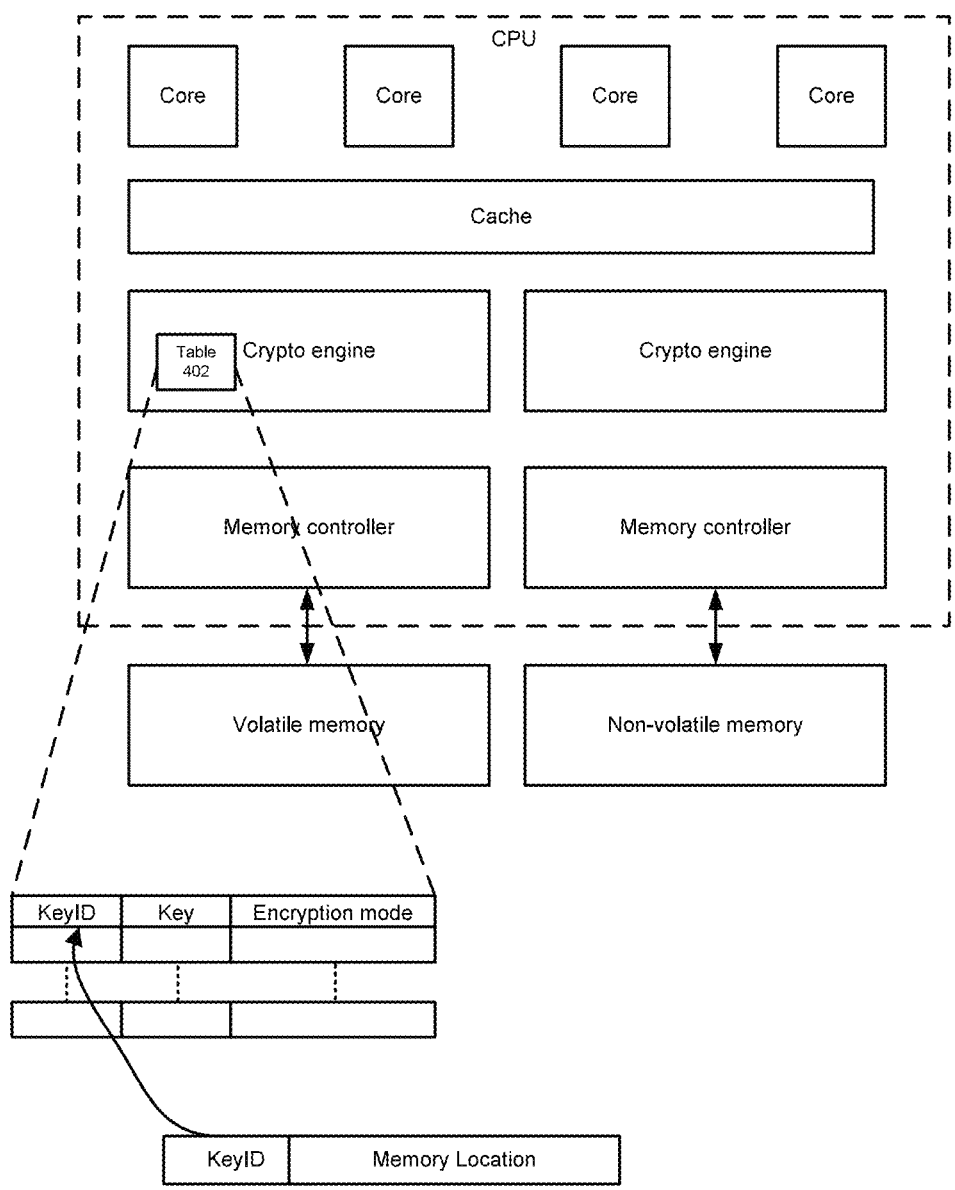
FIG. 4 depicts an example system in accordance with some embodiments.

In some examples, crypto engine 222 is in or accessible to one or more memory controllers. Crypto engine 222 can provide Advanced Encryption Standard (AES)-XEX tweaked-codebook mode with ciphertext stealing (XTS) compatible encryption or decryption. Crypto engine 222 can have a memory region or access a memory region that stores a key table 224 with keys and corresponding of encryption/decryption mode to use based on the key. In some examples, the key and corresponding of encryption/decryption mode can be indexed using a KeyID and verified using the source address. For example, FIG. 4 depicts a non-limiting example of crypto engine 222.

Crypto engine 222 can use, be invoked by, or implemented using one or more of: Intel TME, Intel MK-TME, Intel Software Guard Extensions (SGX), AMD's Secure Memory Encryption (SME), AMD's Secure Encrypted Virtualization (SEV), ARM TrustZone, or derivatives thereof.

Note that if there are multiple VM-VM communications, separate virtual channel instances are created with various identifiers. VMs can communicate with another VM that shares an identifier. If a VM attempts to communicate with VM without a shared identifier, data is not delivered by virtual channel 204 and error would be returned.

Figure 2B:
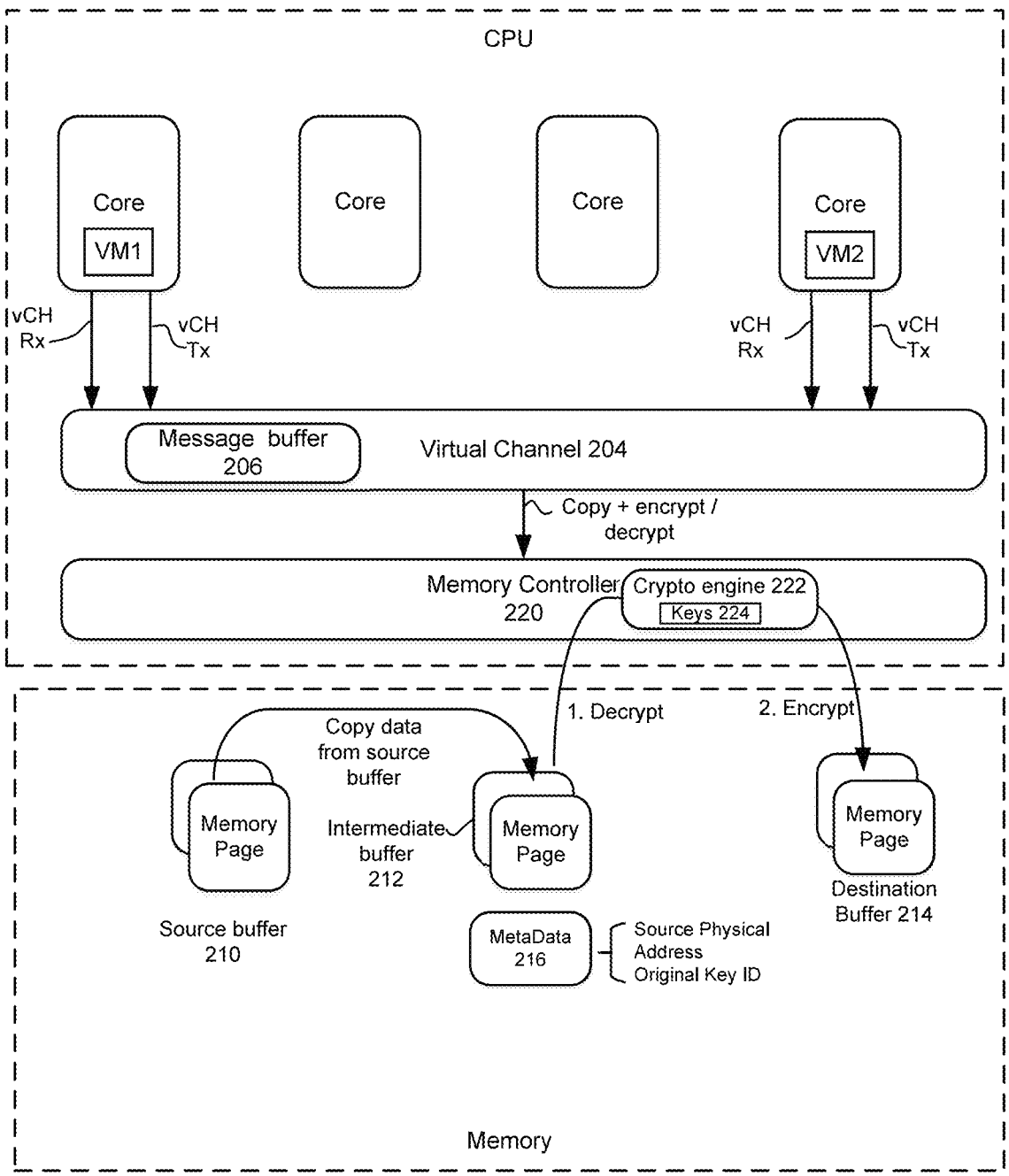
FIG. 2B depicts an example of a system in accordance with some embodiments.

FIG. 2B depicts an example of a system. In this example, virtual channel (vCH) 204 can be implemented in the same CPU as cores that execute VM1 and VM2. For example, vCH 204 can provide messages between VM1 and VM2 and commands to memory controller 220 and crypto engine 222. In this example, VM1 is provisioned to provide transmit or receive commands to virtual channel 204. Likewise, VM2 is provisioned to provide transmit or receive commands to virtual channel 204. Based on a command from a VM1 or VM2, virtual channel 204 can issue a read request for source data in a memory page and request decryption or encryption of the source data or not request any decryption or encryption of the source data. In addition, based on a command from a VM1 or VM2, vCH 204 can issue a write request for source data in a memory page and request decryption or encryption of the source data or not request any decryption or encryption of the source data. A key ID can be embedded in unused bits of a physical address and vCH 204 can retrieve the key ID from a memory read/write command.

For example, if a VM1 requests a copy of data from source buffer 210 to destination buffer 214 (e.g., one or more memory pages), VM1 can issue a transmit request to virtual channel 204. Virtual channel 204 can cause memory controller 220 to copy data from one or more memory pages in source buffer 210 to intermediate buffer 212 (e.g., one or more memory pages) without modification (e.g., without modification by crypto engine). Virtual channel 204 can store a key ID and source physical address in the source buffer of the data into a metadata table 216. Virtual channel 204 can inform the VM2 of availability of data. The VM2 can issue a receive request to virtual channel 204 to copy data from intermediate buffer 212 to destination buffer 214 (e.g., one or more memory pages). Crypto engine 222 can use a key ID and source address to identify a key from key table 224 to use to decrypt the data. Crypto engine 222 can encrypt the data using a page key for VM2 and memory controller 220 can cause the encrypted data to be stored into a memory page of destination buffer 214. In some examples, page keys are stored inside or solely accessible to crypto engine 222 and VM2 page key can be provisioned by VM2 or hypervisor.

Figure 3:
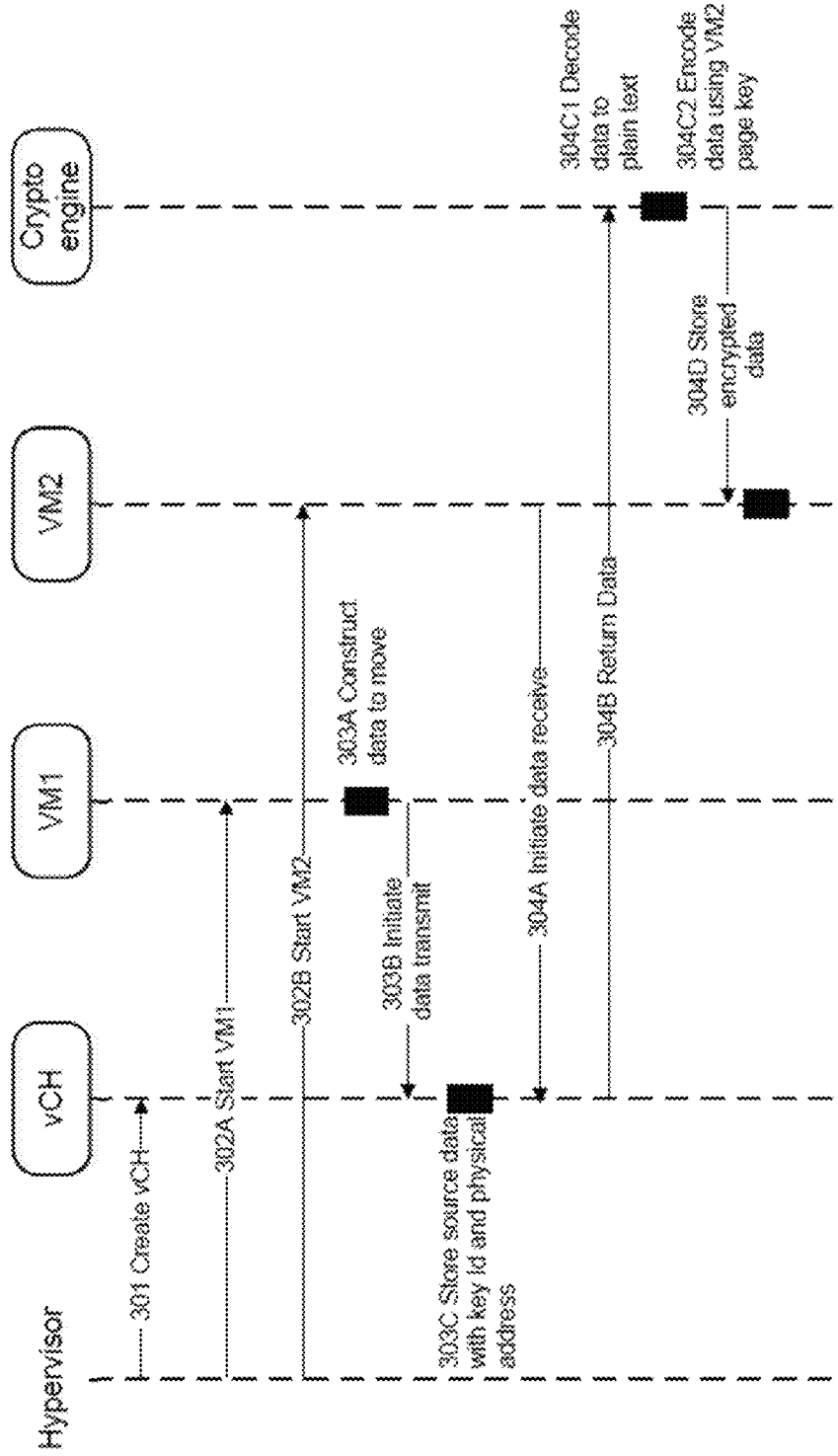
FIG. 3 depicts a data movement sequence for copying data from a memory region used by a first virtual machine to a destination memory region used by a second virtual machine in accordance with some embodiments.

FIG. 3 depicts a data movement sequence for copying data from a memory region used by a first virtual machine to a destination memory region used by a second virtual machine. At 301, a hypervisor sets up a virtual channel (vCH) in the CPU that can be used for communication between specified virtual machines and the virtual machines and the memory controller. The hypervisor also allocates intermediate buffer page(s) in volatile memory. The hypervisor can be a virtual machine monitor (VMM) that creates and supervises virtual machine operation. The hypervisor can reside and execute on the same core, CPU, node or platform as that which can run one or more of the VMs (or processes within a VM) that are to copy or receive data. A platform can include a core, memory, networking, and communication interfaces and is capable of executing software.

At 302A, the hypervisor provisions a VM image for VM1 and at 302B, the hypervisor provisions a VM image for VM2. In this example, VM1 and VM2 run on the same CPU as that of the hypervisor. In some examples, VM1 and VM2 execute on a same platform as that which runs the hypervisor, however either or both of VM1 and VM2 can be provisioned to run on a different platform than that of the hypervisor. During 302A and 302B, the hypervisor provisions VM1 and VM2 with memory page keys, key IDs, and assigned vCH. Accordingly, VM1 and VM2 are launched with an assigned vCH to use for VM-to-VM communication and the vCH is provisioned with key IDs for use by VM1 and VM2.

At 303A, a VM1 constructs a payload in a source buffer for transfer or copy to a memory region associated with VM2. A crypto engine can perform an encryption of the payload in connection with a write of the payload into the source buffer. The encryption can be made using the key associated with key ID provided by the hypervisor at 302A. At 303B, VM1 posts to the vCH a transmit command and includes the starting physical address of data in source buffer and length of payload. The physical address can be a volatile memory starting address of the source data in a source buffer (from the standpoint of the hypervisor).

At 303C, in response to the transmit command from VM1, vCH invokes a memory controller to copy the payload from the source buffer to an intermediate buffer. The transmit command can include a key ID and a source address. In response, vCH copies encrypted payload from the source buffer in memory (e.g., volatile memory) to the intermediate buffer (e.g., in volatile memory) without modification of the payload (e.g., decryption and/or encryption). The decrypt-then-encrypt operations are bypassed because vCH works as a channel that causes a memory controller to copy plain text payload data (or encrypted payload data) without modification. In some examples, a crypto engine accessible to the memory controller is not used during the copy of the payload from the source buffer to the intermediate buffer. The crypto engine is available for use by one or more memory controllers in connection with write or read operations.

At 303C, vCH causes the key ID for the payload and payload's starting physical address in source buffer to be stored into a metadata table associated with the intermediate buffer. In some examples, a key ID can be embedded in unused bits of a physical address provided with a transmit command and vCH 204 can retrieve the key ID from the transmit command. In some examples, data stored in the source buffer has a key ID allocated by a hypervisor or provisioned by VM1. In some examples, a hypervisor can provide a key ID for the source payload or source buffer to the vCH. The metadata table can be stored in the intermediate buffer or a different memory page than that used to store the intermediate buffer.

Also, at 303C, the vCH posts an interrupt to VM2 that a payload is available. In addition, or alternatively, VM1 can provide to VM2 a data length of the data copied to the intermediate buffer using a transmit or receive command provided to the vCH. At 304A, VM2 issues a receive command to the vCH to retrieve payload from an intermediate buffer and copy the payload to a destination buffer. In some examples, the receive command specifies use of a key ID to use decrypt the payload and a VM2 page key to use to encrypt the payload. At 304B, in response to the receive command, vCH provides a command to the memory controller and its crypto engine to perform a copy of the payload from the intermediate buffer and decryption using a key retrieved based on the key ID and the starting address. The vCH accesses the key Id and source address stored in metadata and the vCH provides keyID and source address to the crypto engine used by a memory controller. The crypto engine retrieves the key using the keyID and source address. The key can be stored in a secure table accessible to the crypto engine.

At 304C1, the crypto engine performs decryption of the payload stored in the intermediate buffer (e.g., memory page) into plain text using the key associated with the key ID. At 304C2, the crypto engine encodes the plain text data using a VM2 page key. The VM2 page key can be provisioned by the hypervisor and stored inside the crypto engine or in a secure memory location accessible to the crypto engine. At 304D, memory controller writes the encrypted data into a destination memory region that is associated with VM2. Accordingly, two different keys can be used for reading and writing data from the intermediate buffer to a destination buffer. In addition, instead of four cryptography operations, two cryptography operations can be performed in connection with secure transfer of data for use by another VM. Accordingly, linking of VNFs with secure sharing of data can be provided.

After the VM2 processes the data from the VM1, the VM2 can make the processed data available to VM1 or to another VM or VNF for additional processing. For example, if VM2 is to provide result data to VM1, the VM2 can invoke vCH to perform a copy of result data through intermediate buffer to a memory region associated with VM1 in a manner described herein using a single decryption operation and single encryption operation. Likewise, if VM2 is to copy result data or any data for use by another VM (e.g., VM3), VM2 can invoke vCH to cause a copy of data to a memory region associated with VM3. The examples can be extended whereby a hypervisor provisions VM3 with memory page keys, key Ids, and assigned vCH for use to send or receive data.

FIG. 4 depicts an example of a memory controller with access to a crypto engine. A memory controller can be provided for read or write operations involving a volatile memory. The same or other memory controller can be provided for read or write operations involving a non-volatile memory. A crypto engine is in a direct data path to external memory buses and all the memory data entering and/or leaving the CPU can be encrypted or decrypted. The data inside the caches and accessible to the cores are in plain text. The encryption key can be generated by the CPU and therefore, is not visible to the software. Crypto engine can include or access a table 402 that can store keys. The keys can be accessed using a key ID and source physical address. For example, the crypto engine can receive the key ID and source physical address from a vCH or access the key ID and source physical address from a meta data table.

Figure 5A:
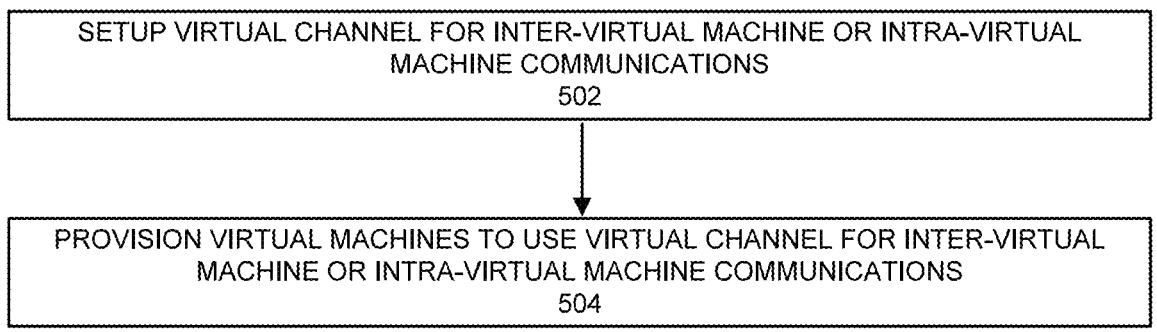
FIG. 5A depicts an example process in accordance with some embodiments.

FIG. 5A depicts an example process. At 502, a virtual channel for inter-virtual machine or intra-virtual machine communications is provisioned. For example, a hypervisor can provision the virtual channel. The virtual channel can provide a ring for message passing between virtual machines or processes within a virtual machine. In addition, the virtual channel can receive communications from a virtual machine to initiate a payload transmit or payload receive operation. The payload transmit operation can cause a payload in a source buffer to be copied without modification to an intermediate buffer. The key ID and the source address of the payload can be stored in a metadata table. The payload receive operation can cause the payload to be decrypted using a key associated with the key ID and the source address of the payload and encrypted using the same or different key. At 504, virtual machines are setup to use the virtual channel for communications. For example, a hypervisor can cause instantiation of multiple virtual machines and setup the virtual machines to use the particular virtual channel for inter-virtual machine or intra-virtual machine communications.

Figure 5B:
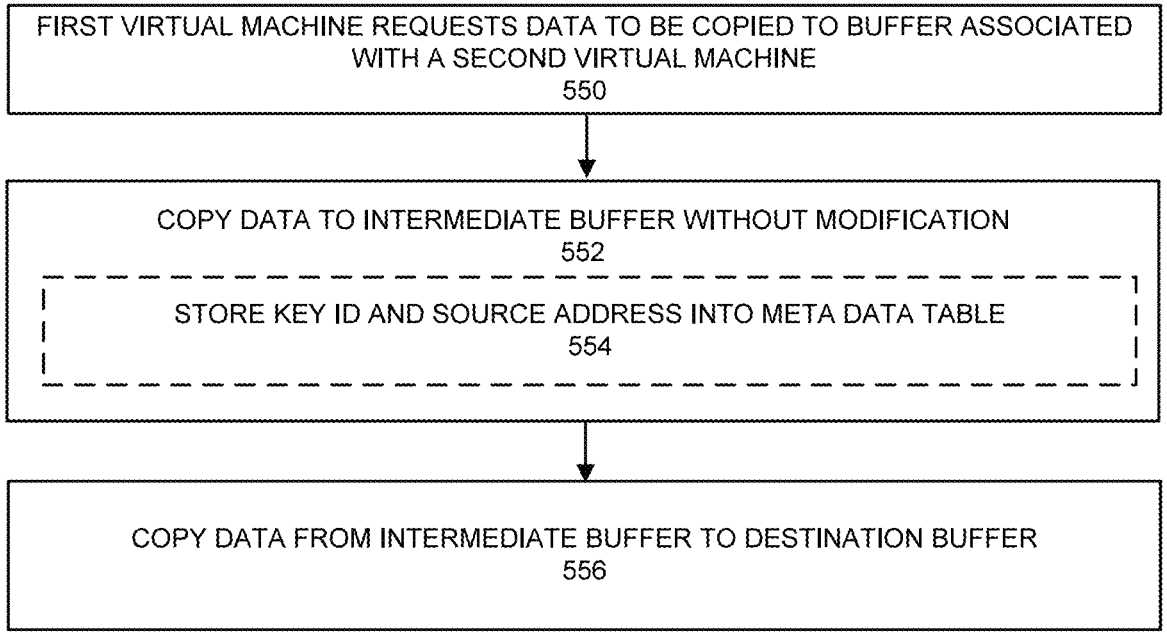
FIG. 5B depicts an example process in accordance with some embodiments.

FIG. 5B depicts an example process. The process can be performed by multiple virtual machines or processes within a virtual machine for a data transfer. For example, a virtual machines (or processes) can be linked VNFs where a first VNF (or process) calls a second VNF (or process) to perform processing on data. At 550, a first virtual machine requests data to be copied to a buffer associated with a second virtual machine. The data can be requested to be copied from a source buffer to a destination buffer. At 552, the data is copied to an intermediate buffer without modification. For example, a virtual channel provisioned for communication between virtual machines can cause the copy of data from a source buffer to an intermediate buffer. At 554, in connection with the copy of the data from the source buffer to the intermediate buffer, the virtual channel can store a key ID and source address associated with the data. At 556, the data is copied from the intermediate buffer to the destination buffer. For example, the virtual channel that is managing the operation can cause a memory controller to copy the data and utilize a crypto engine for decrypting the data read from the intermediate buffer and encrypting the data written to the destination buffer. For example, 556 can include one or more of 558 to 564 (FIG. 5C).

Figure 5C:
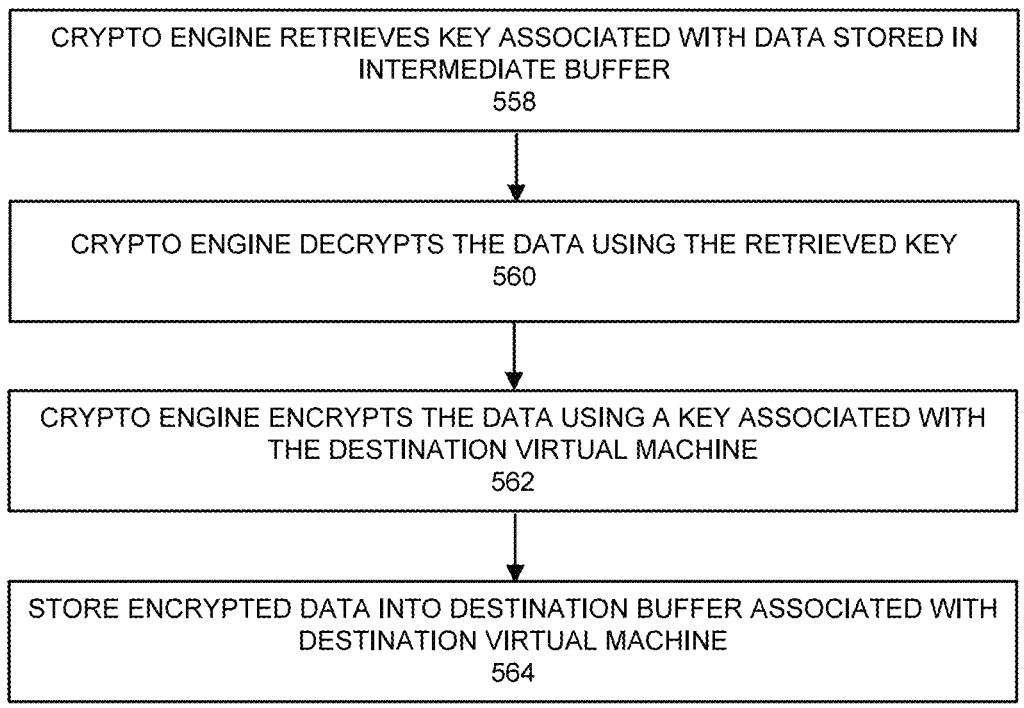
FIG. 5C depicts an example process in accordance with some embodiments.

FIG. 5C depicts an example process of action 556. At 558, a crypto engine retrieves a key associated with the key ID and source address for the data. The key can be retrieved from a secure table accessible solely or semi-exclusively to the crypto engine using the key ID and the source address for the data. At 560, the crypto engine decrypts the data using the key associated with the key ID and source address for the data. At 562, the crypto engine encrypts the data using a page key associated with the destination VM. At 564, a memory controller causes the encrypted data to be written to the destination buffer.

Figure 6:
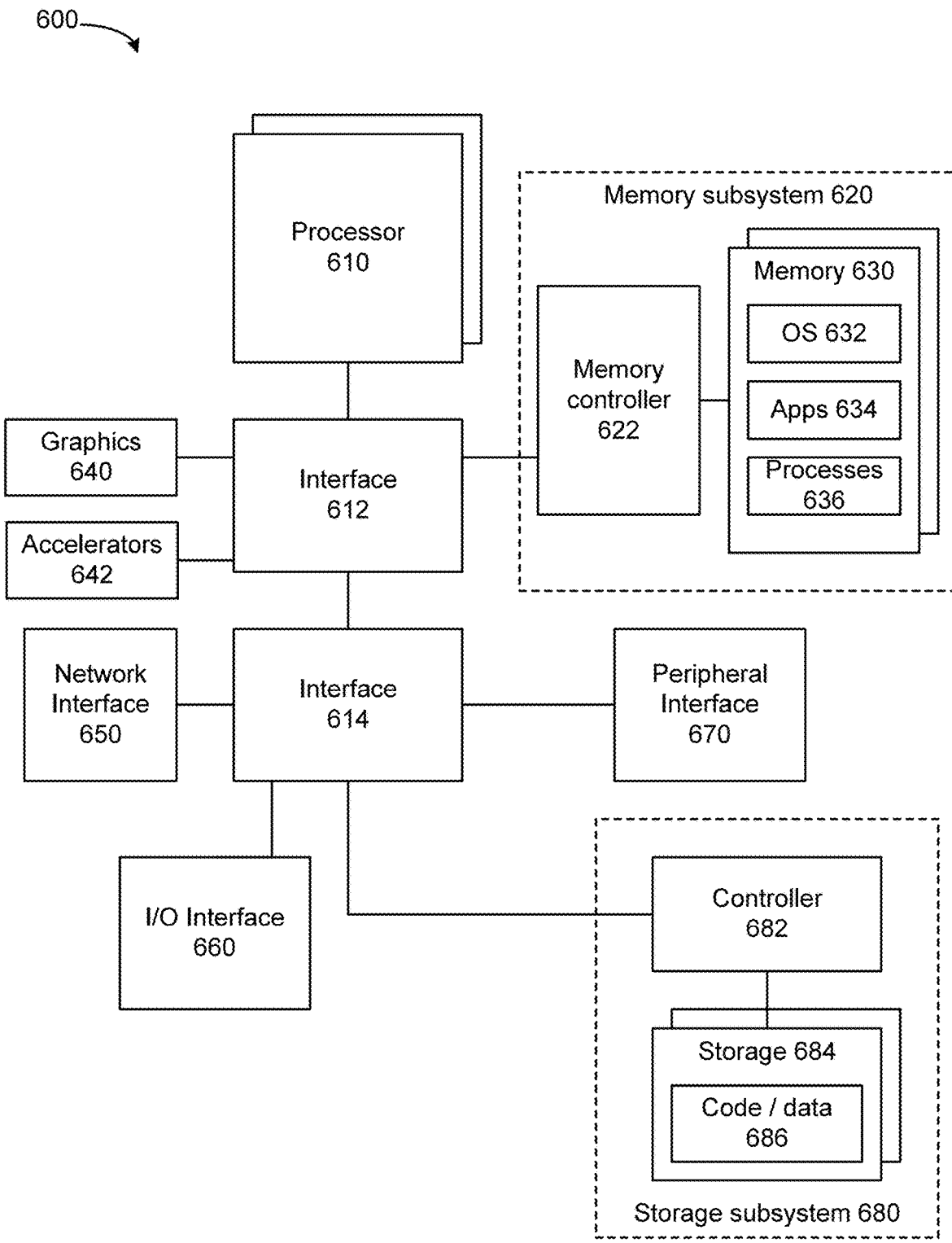
FIG. 6 depicts a system in accordance with some embodiments.

FIG. 6 depicts a system. The system can use embodiments described herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620, graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 642 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1364 bus.

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 684 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
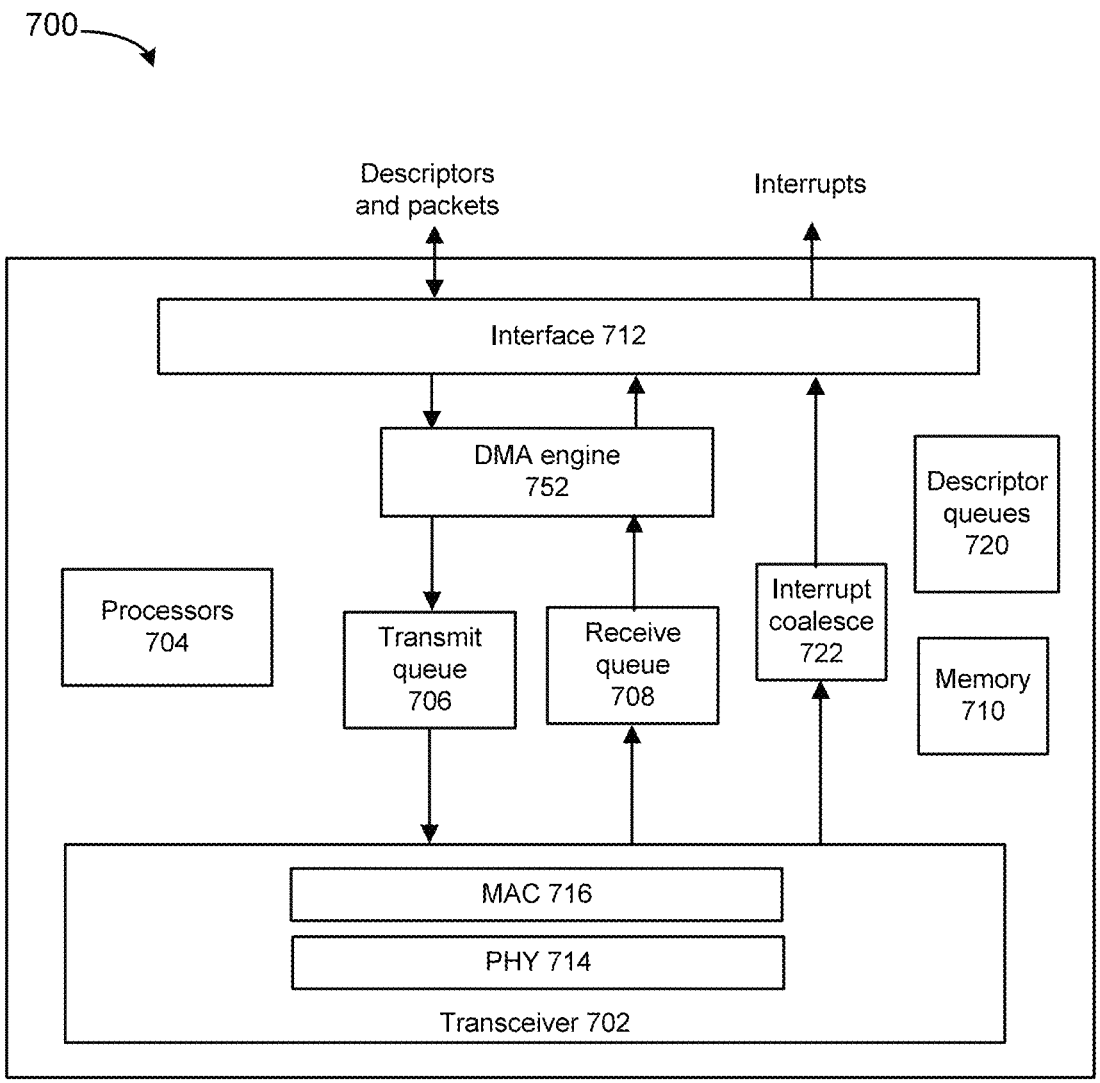
FIG. 7 depicts an example of a network interface in accordance with some embodiments.

FIG. 7 depicts an example of a network interface. Various embodiments can use the network interface or be used by the network interface. For example, a data center or server can use the network interface. For example, network interface 700 can be a smart network interface controller (NIC) that executes multiple or linked VMs or VNFs. Network interface 700 can use transceiver 702, processors 704, transmit queue 706, receive queue 708, memory 710, and bus interface 712, and DMA engine 752. Transceiver 702 can be capable of receiving and transmitting packets from a wired or wireless medium in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to assemble data to be transmitted into packets, that include destination and source addresses along with network control information and error detection hash values. Processors 704 can be any a combination of a: processor, core, graphics processing unit (GPU), field programmable gate array (FPGA), application specific integrated circuit (ASIC), or other programmable hardware device that allow programming of network interface 700. For example, processors 704 can provide for identification of a resource to use to perform a workload and generation of a bitstream for execution on the selected resource. For example, a "smart network interface" can provide packet processing capabilities in the network interface using processors 704.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Packet allocator 724 can provide distribution of received packets for processing by multiple CPUs or cores using timeslot allocation described herein or RSS. When packet allocator 724 uses RSS, packet allocator 724 can calculate a hash or make another determination based on contents of a received packet to determine which CPU or core is to process a packet.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Figure 8:
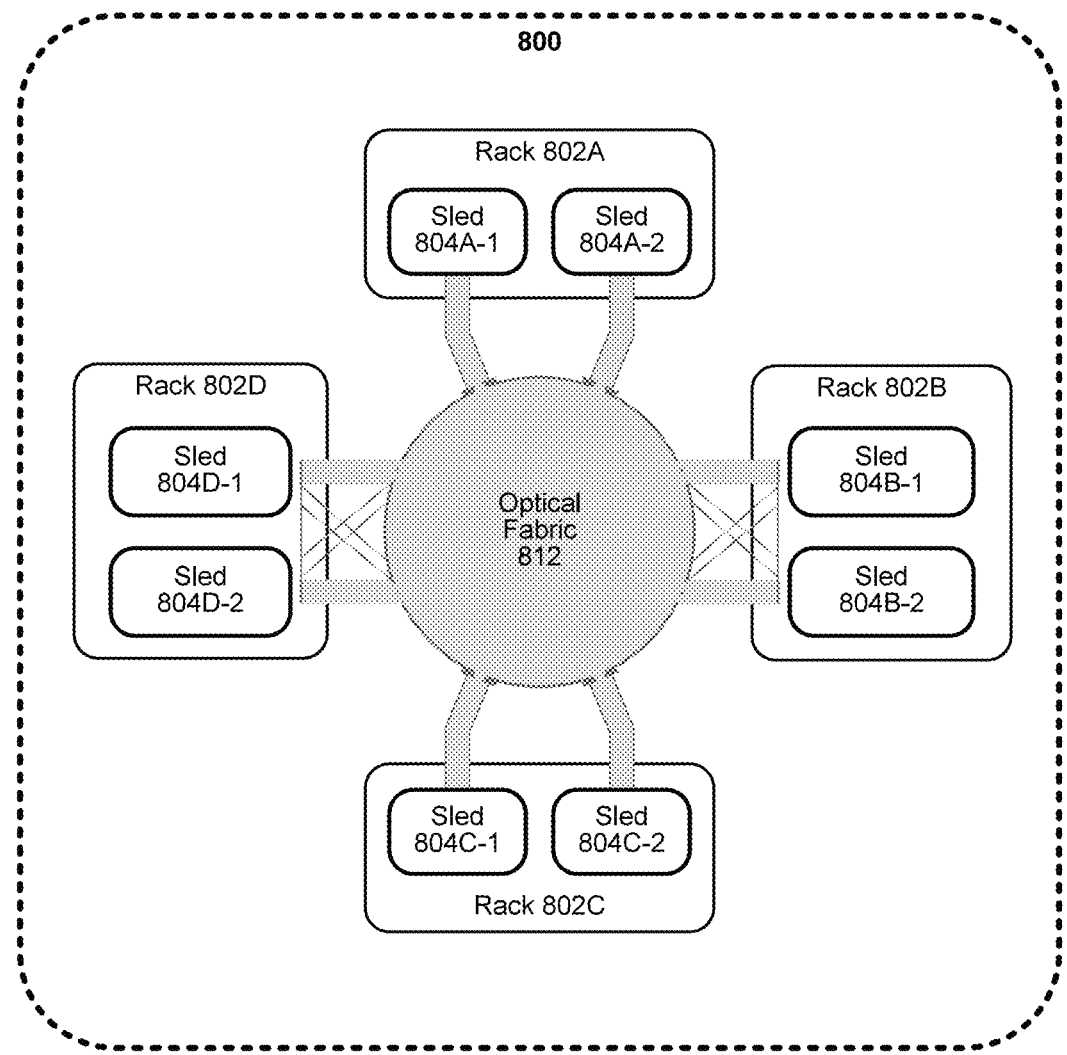
FIG. 8 depicts an example of a data center in accordance with some embodiments.

FIG. 8 depicts an example of a data center. Various embodiments can be used in or with the data center of FIG. 8. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. However, optical, wireless, and/or electrical signals can be transmitted using fabric 812. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 8012, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus for process-to-process communication in network functions virtualization (NFV) infrastructures, the apparatus comprising: a memory; and at least one processor comprising a memory controller and a crypto engine, the at least one processor to: execute a first network function within a virtual machine; execute a second network function within a second virtual machine; provide a virtual channel for communication between the first network function and the second network function; and in response to the first network function requesting a copy of data for access by the second network function, the at least one processor is to copy the data without modification to an intermediate buffer, store a reference to a key for the data, and copy the data from the intermediate buffer to a destination buffer by use of the crypto engine to decrypt the data based on the key and encrypt the data prior to storage in a destination buffer accessible to the second network function.

Example 2 includes the subject matter of any Example, wherein to store a reference to a key for the data, the at least one processor is to cause storage of a key identifier and source address of the data into a metadata table, wherein the metadata table is accessible to the crypto engine.

Example 3 includes the subject matter of any Example, wherein the crypto engine is to access a table to retrieve a key using the key identifier and the source address.

Example 4 includes the subject matter of any Example, wherein the virtual channel is to provide a ring for communication between the first network function and the second network function.

Example 5 includes the subject matter of any Example, wherein the first network function is to issue a transmit command to the virtual channel and in response to the transmit command, the virtual channel is to cause the memory controller to copy the data without modification to an intermediate buffer and store the reference to the key for the data.

Example 6 includes the subject matter of any Example, wherein the virtual channel is to cause the second network function to issue a receive command to the virtual channel and in response to the receive command, the virtual channel is to cause the memory controller to copy the data from the intermediate buffer to the destination buffer and use the crypto engine to decrypt the data based on the key and encrypt the data using a page key associated with the second network function.

Example 7 includes the subject matter of any Example, wherein the crypto engine is to perform Advanced Encryption Standard (AES)-XEX tweaked-codebook mode with ciphertext stealing (XTS) compatible encryption or decryption.

Example 8 includes the subject matter of any Example, wherein the first network function or the second network function can perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC).

Example 9 includes the subject matter of any Example, comprising one or more of: a base station, central office, server, network interface, rack, or data center.

Example 10 includes a method comprising: receiving a request to write data associated with a first virtual network function to a destination buffer associated with a second virtual network function, the first virtual network function and the second virtual network function together performing linked operations; in response to the request to write data, copying the data without modification to an intermediate buffer and storing a key identifier and source address associated with the data; and in response to the request to receive data from the second virtual network function: a crypto engine retrieving a key based on the key identifier and source address; the crypto engine decrypting the data in the intermediate buffer using the key; the crypto engine encrypting the data using a key associated with the second virtual network function; and causing the encrypted data to be written to the destination buffer.

Example 11 includes the subject matter of any Example, comprising a virtual channel receiving the request to write data and the virtual channel causing a memory controller to copy the data to the intermediate buffer without modification and the virtual channel causing the crypto engine to retrieve the key from a table based on the key identifier and the source address.

Example 12 includes the subject matter of any Example, comprising the virtual channel providing communication among the first virtual network function, the second virtual network function, a memory controller, and the crypto engine.

Example 13 includes the subject matter of any Example, wherein the key identifier and the source address are hidden from the second virtual network function.

Example 14 includes the subject matter of any Example, wherein the first network function or the second network function can perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC).

Example 15 includes the subject matter of any Example, wherein the crypto engine applies Advanced Encryption Standard (AES)-XEX tweaked-codebook mode with ciphertext stealing (XTS) compatible encryption or decryption.

Example 16 includes the subject matter of any Example, comprising: a hypervisor setting up a virtual channel and the hypervisor starting the first network function and the second network function and programming the first network function and the second network function to use the virtual channel for communication.

Example 17 includes a system for virtual network function linking comprising: an interface; a memory controller comprising a crypto engine; at least one memory; and at least one core communicatively coupled to the interface, the memory controller, and the at least one memory, the at least one core to: execute a first virtual network function; execute a second virtual network function; in response to a transmit request from the first virtual network function, cause data to be written to an intermediate buffer without modification and cause a key identifier and source address to be stored; and in response to a receive request from the second virtual network function, cause the data in the intermediate buffer to be: decrypted based on a key associated with the key identifier and the source address, encrypted using a key associated with the second virtual network function, and the encrypted data to be written to a destination buffer associated with the second virtual network function.

Example 18 includes the subject matter of any Example, wherein the crypto engine is to access the key associated with the key identifier and the source address from a secure table.

Example 19 includes the subject matter of any Example, wherein the first network function or the second network function can perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC).

Example 20 includes the subject matter of any Example, wherein the crypto engine is to apply Advanced Encryption Standard (AES)-XEX tweaked-codebook mode with ciphertext stealing (XTS) compatible encryption or decryption.

Example 21 includes the subject matter of any Example, wherein the interface comprises one or more of: a network interface, a fabric interface, a bus interface.

What is claimed is:

1. An apparatus for process-to-process communication in network functions virtualization (NFV) infrastructures, the apparatus comprising:
    a memory; and
    at least one processor comprising a memory controller and a crypto circuitry, the at least one processor to:
        execute a first network function within a virtual machine;
        execute a second network function within a second virtual machine;
        provide a virtual channel for communication between the first network function and the second network function, wherein the first network function is to perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC) and wherein the second network function is to perform one or more of: next destination determination, routing, firewall, IDS, IPS, GGSN, SGSN, RNC, or EPC; and
        in response to the first network function requesting a copy of data for access by the second network function, the at least one processor is to copy the data without modification to an intermediate buffer, store a reference to a key for the data, and copy the data from the intermediate buffer to a destination buffer by use of the crypto circuitry to decrypt the data based on the key and encrypt the data prior to storage in a destination buffer accessible to the second network function, wherein the copied data comprises data processed by the first network function.

2. The apparatus of claim 1, wherein to store a reference to a key for the data, the at least one processor is to:
    cause storage of a key identifier and source address of the data into a metadata table, wherein the metadata table is accessible to the crypto circuitry.

3. The apparatus of claim 2, wherein the crypto circuitry is to access a table to retrieve a key using the key identifier and the source address.

4. The apparatus of claim 1, wherein the virtual channel is to provide a ring for communication between the first network function and the second network function.

5. The apparatus of claim 1, wherein the first network function is to issue a transmit command to the virtual channel and in response to the transmit command, the virtual channel is to cause the memory controller to copy the data without modification to an intermediate buffer and store the reference to the key for the data.

6. The apparatus of claim 1, wherein the virtual channel is to cause the second network function to issue a receive command to the virtual channel and in response to the receive command, the virtual channel is to cause the memory controller to copy the data from the intermediate buffer to the destination buffer and use the crypto circuitry to decrypt the data based on the key and encrypt the data using a page key associated with the second network function.

7. The apparatus of claim 1, wherein the crypto circuitry is to perform Advanced Encryption Standard (AES)-XEX tweaked-codebook mode with ciphertext stealing (XTS) compatible encryption or decryption.

8. The apparatus of claim 1, comprising one or more of: a base station, central office, server, network interface, rack, or data center.

9. The apparatus of claim 1, wherein the virtual channel is to execute on a first processor of the at least one processor and wherein the first processor is to execute the virtual machine and the second virtual machine.

10. A method comprising:
a virtual channel receiving a request to write data processed by a first virtual network function to a destination buffer associated with a second virtual network function, the first virtual network function and the second virtual network function together performing linked operations, wherein the first virtual network function is to perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC) and wherein the second virtual network function is to perform one or more of: next destination determination, routing, firewall, IDS, IPS, GGSN, SGSN, RNC, or EPC;
in response to the request to write data, the virtual channel causing copying the data without modification to an intermediate buffer and storing a key identifier and source address associated with the data; and
in response to the request to receive data from the second virtual network function:
a crypto circuitry retrieving a key based on the key identifier and source address;
the crypto circuitry decrypting the data in the intermediate buffer using the key;
the crypto circuitry encrypting the data using a key associated with the second virtual network function; and
causing the encrypted data to be written to the destination buffer.

11. The method of claim 10, comprising the virtual channel causing the crypto circuitry to retrieve the key from a table based on the key identifier and the source address.

12. The method of claim 11, comprising the virtual channel providing communication among the first virtual network function, the second virtual network function, a memory controller, and the crypto circuitry.

13. The method of claim 10, wherein the key identifier and the source address are hidden from the second virtual network function.

14. The method of claim 10, wherein the crypto circuitry applies Advanced Encryption Standard (AES)-XEX tweaked-codebook mode with ciphertext stealing (XTS) compatible encryption or decryption.

15. The method of claim 10, comprising:
a hypervisor setting up a virtual channel and
the hypervisor starting the first virtual network function and the second virtual network function and programming the first virtual network function and the second virtual network function to use the virtual channel for communication.

16. A system for virtual network function linking comprising:
an interface;
a memory controller comprising a crypto circuitry;
at least one memory; and
at least one core communicatively coupled to the interface, the memory controller, and the at least one memory, the at least one core to:
execute a first virtual network function;
execute a second virtual network function, wherein the first virtual network function is to perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC) and wherein the second virtual network function is to perform one or more of: next destination determination, routing, firewall, IDS, IPS, GGSN, SGSN, RNC, or EPC;
in response to a transmit request from the first virtual network function, cause data to be written to an intermediate buffer without modification and cause a key identifier and source address to be stored; and
in response to a receive request from the second virtual network function, cause the data in the intermediate buffer to be: decrypted based on a key associated with the key identifier and the source address, encrypted using a key associated with the second virtual network function, and the encrypted data to be written to a destination buffer associated with the second virtual network function.

17. The system of claim 16, wherein the crypto circuitry is to access the key associated with the key identifier and the source address from a secure table.

18. The system of claim 16, wherein the crypto circuitry is to apply Advanced Encryption Standard (AES)-XEX tweaked-codebook mode with ciphertext stealing (XTS) compatible encryption or decryption.

19. The system of claim 16, wherein the interface comprises one or more of: a network interface, a fabric interface, a bus interface.

20. At least one non-transitory computer-readable medium comprising instructions stored thereon, that if executed by one or more processors, cause the one or more processors to:
create a first virtual channel for first virtual network function-to-second virtual network function communication and
create a second virtual channel for third virtual network function-to-fourth virtual network function communication,
wherein:
the first virtual network function is to perform one or more of: next destination determination, routing, firewall, Intrusion detection systems (IDS), intrusion prevention systems (IPS), gateway general packet radio service support node (GGSN), serving general packet radio service support node (SGSN), Radio Network Controller (RNC), or Evolved Packet Core (EPC),
the second virtual network function is to perform one or more of: next destination determination, routing, firewall, IDS, IPS, GGSN, SGSN, RNC, or EPC,
in response to a request from the second virtual network function, data in a buffer is to be: decrypted based on a first key, encrypted using a second key, and the encrypted data to be written to a destination buffer associated with the second virtual network function, a central processing unit (CPU) executes the first virtual network function and the second virtual network function, the first virtual channel executes on the CPU, a second CPU executes the third virtual network function and the fourth virtual network function, and the second virtual channel executes on the second CPU.

21. The at least one computer-readable medium of claim 20, wherein a hypervisor is to create the first virtual channel and the second virtual channel.

* * * * *